Feb. 28, 1956   M. F. DUNNE, JR   2,736,205
PULLEY AND METHOD OF MAKING SAME
Filed Jan. 21, 1955   2 Sheets-Sheet 1
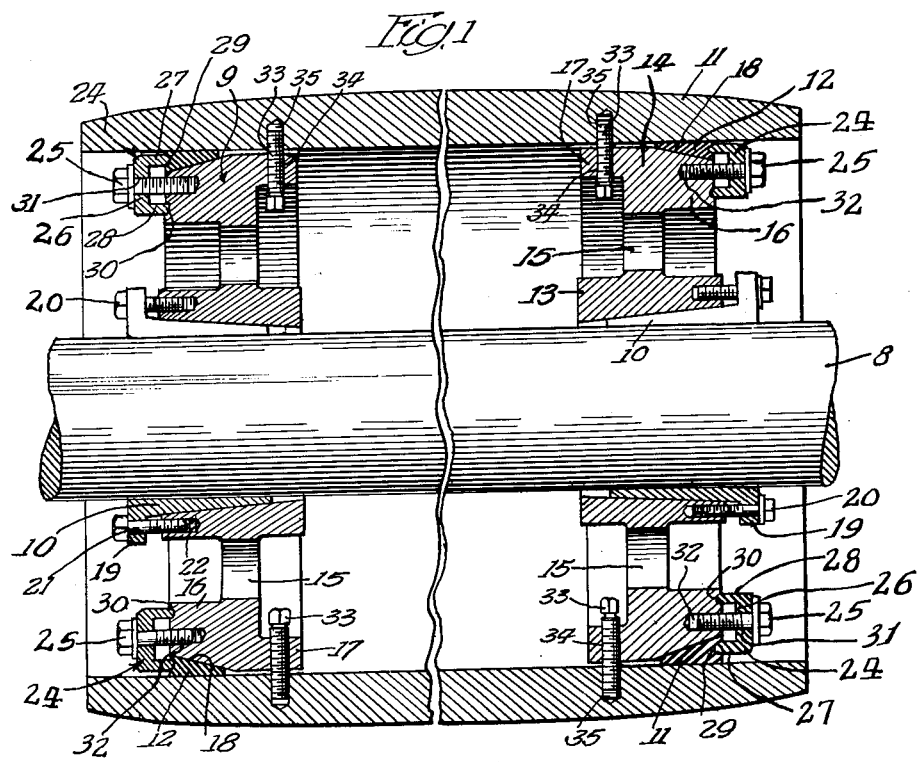
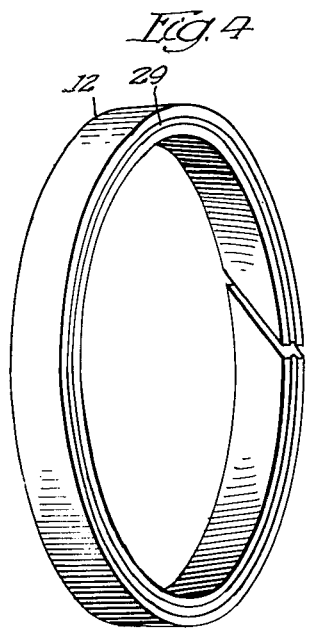
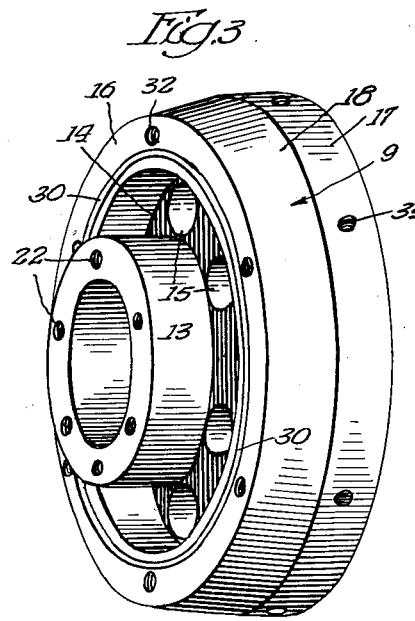
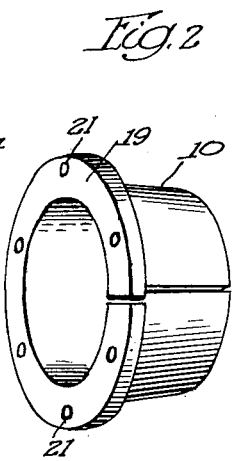
Inventor:
MAURICE F. DUNNE Jr.

Feb. 28, 1956 M. F. DUNNE, JR 2,736,205
PULLEY AND METHOD OF MAKING SAME
Filed Jan. 21, 1955 2 Sheets-Sheet 2

Inventor:
MAURICE F DUNNE JR
By: Fred Gerlach atty.

United States Patent Office 2,736,205
Patented Feb. 28, 1956

2,736,205

PULLEY AND METHOD OF MAKING SAME

Maurice F. Dunne, Jr., Winnetka, Ill.

Application January 21, 1955, Serial No. 483,236

11 Claims. (Cl. 74—230.3)

The present invention relates generally to pulleys. More particularly, the invention relates to that type of pulley which is adapted with a similar pulley or a plurality of similar pulleys to support an endless conveyor belt and as its components or parts comprises an elongated cylindrical belt-supporting side wall and a pair of circular end walls which are positioned or located within the ends of the side wall, embody centrally disposed hubs for receiving a shaft, and have their outer peripheral portions connected to the ends of the side wall.

It has heretofore been proposed in connection with the manufacture of a pulley of the aforementioned type either to form the side and end walls of a one-piece casting or to form the end walls separately from the side wall and weld the outer peripheral portions of the end walls to the ends of the side wall. In practice, it has been found that a pulley that is made according to either of such methods of manufacture is subject to certain inherent objections. If the side and end walls of the pulley are in the form of a one-piece casting, the pulley as a whole is costly and difficult to produce. Furthermore, it is necessary for the pulley manufacturer to have numerous patterns and other molding equipment in order to be able to provide to purchasers pulleys of different lengths and diameters. It is also necessary for the manufacturer to maintain a substantial and costly pulley inventory in order expeditiously to fill orders for pulleys of different lengths and diameters. If the end walls of the pulley are formed separately from the side wall and are connected to the side wall by welding their outer marginal portions to the side wall ends, the pulley is difficult and costly to produce because of complex welding operations and the fact that it is necessary to machine the inner and outer peripheries of the side wall so that they are truly circular in cross section. In addition, if the side wall of the pulley is subjected to excessive wear, it cannot be replaced and hence it is necessary to substitute a new pulley for the worn pulley.

One object of the invention is to provide a belt-supporting pulley which is an improvement upon, and eliminates the objections to, conventional or standard pulleys and is characterized by the fact that its construction and design are such that it is possible to form the side wall by cutting it from a length of a standard pipe of cast iron or other metal or material. By forming the side wall of the pulley of a section of a length of standard pipe, the cost of the pulley is materially reduced and it is possible readily to replace the side wall in the event of wear or if it is desired to increase or decrease the length of the pulley. The present pulley permits the pulley manufacturer to purchase on the open market lengths of standard pipe for side wall forming purposes and enables the manufacturer to keep in stock only end walls of different diameters in order to manufacture at a low cost pulleys of different lengths and diameters.

Another object of the invention is to provide a pulley of the last mentioned character in which the outer peripheral portions of the end walls are connected to the ends of the pipe-formed side wall by way of split wedge-type rings which have cylindrical outer peripheries for engagement with the ends of the inner periphery of the side wall and inwardly flared inner peripheries for engagement with corresponding or complemental outwardly tapered surfaces on the peripheral portions of the end walls, and are adapted when shifted inwards into their operative position in connection with construction or fabrication of the pulley to expand and thereby cause the side wall which is usually or generally non-circular because it is in the form of a section of pipe to assume a truly circular form.

Another object of the invention is to provide a pulley of the type and character under consideration in which the wedge-type rings for connecting the outer peripheral portions of the end walls to the ends of the side wall are slit diagonally instead of axially in order that the ends of the side walls are supported throughout 360°.

Another object of the invention is to provide a belt-supporting pulley of the aforementioned character in which the wedge-type rings are shifted into their operative position by simple and novel means and the outer peripheral portions of the end walls are provided with outwardly and radially extending screws which extend into screw-threaded holes in the end portions of the side wall and serve when in place positively to lock the side wall against angular displacement with respect to the end walls.

A still further object of the invention is the provision of a pulley manufacturing or fabricating method which is essentially simple and economical and as steps comprises: (1) taking a pair of circular hub-equipped end walls of the desired external diameter and with outwardly tapered surfaces on their outer peripheral portions and mounting them on a shaft so that they are spaced apart a distance substantially equal to the desired length of the pulley to be formed and also so that they are in rigid relation with and truly at right angles to the shaft; (2) cutting from a length of standard cast iron or other metallic pipe of slightly greater internal diameter than the external diameter of the end walls a section the length of which corresponds to the desired length of the pulley to be formed; (3) manipulating the cut pipe section so that it extends concentrically around the shaft and the ends thereof surround and are spaced outwards of the outer peripheral portions of the end walls; (4) inserting between said outwardly tapered surfaces on the outer peripheral portions of the end walls and the ends of the inner periphery of the pipe section split wedge-type rings with cylindrical outer peripheries and inwardly flared inner peripheries, and at the same time forcing or shifting the rings inwards so as to cause them to expand and thereby not only cause the pipe section to assume a truly circular form but also effect connection of the ends of the pipe section to the outer peripheral portions of the end walls; and (5) machining the outer periphery of the cut pipe section so that it is of the desired configuration in the direction of its axis and also truly circular in cross section from end to end.

Other objects of the invention and the various advantages and characteristics of the present pulley and its method of manufacture will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a longitudinal section of a sectional pulley embodying the invention and made in accordance with the improved method of manufacture;

Figure 2 is a perspective view of one of the split tapered sleeves which are employed in connection with mounting of the pulley end walls on the shaft;

Figure 3 is a perspective view of one of the end walls of the pulley;

Figure 4 is a perspective view of one of the split wedge-type rings which serve when shifted into their operative position wherein they are in expanded form not only to cause the pipe-formed side wall to assume a circular form but also to connect the ends of the side wall to the outer peripheral portions of the pulley end walls;

Figure 6:
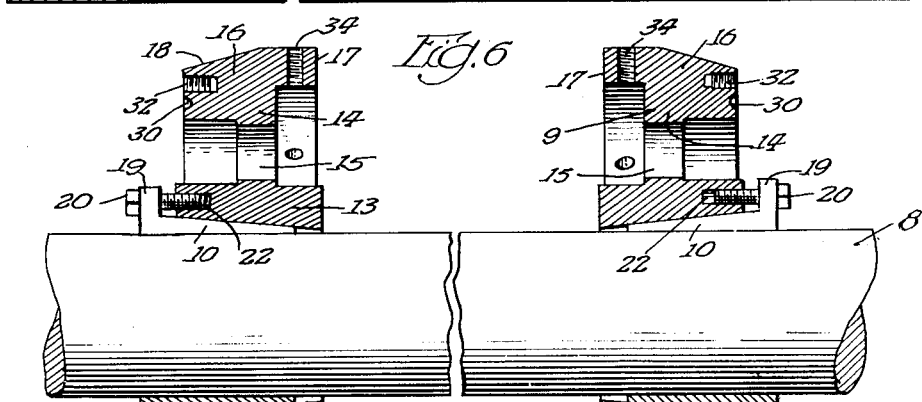
Figure 7:
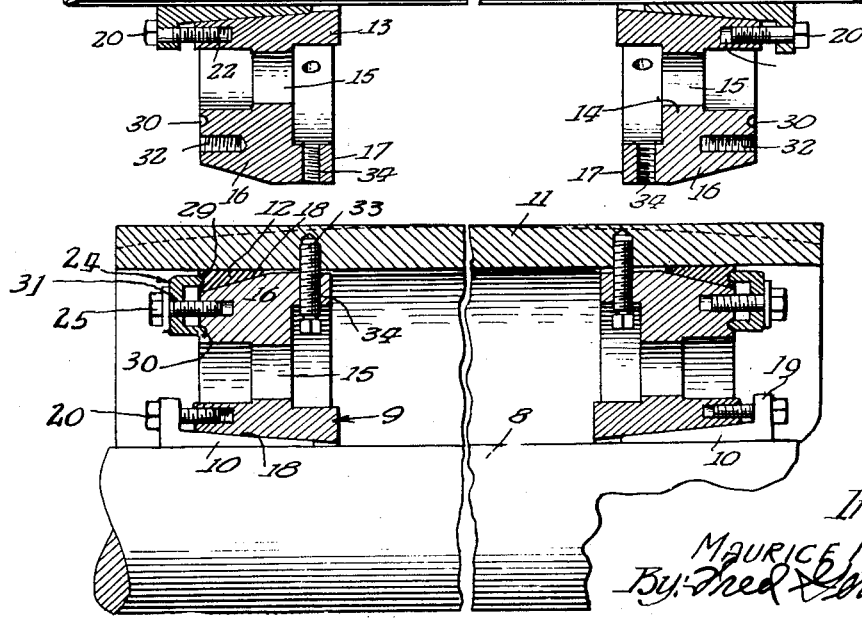

Figure 6 is a view showing in section the two end walls after mounting thereof on the pulley shaft by way of the split tapered sleeves and before mounting in place of the pipe-formed side wall and the split wedge-type rings; and Figure 7 is a view like Figure 6 except that it shows the side wall and rings after being mounted in place with respect to the end walls and illustrates by way of a dotted line the contour of the outer periphery of the pulley side wall after machining thereof to complete the pulley.

The pulley which is shown in the drawings constitutes the preferred form or embodiment of the invention. It is adapted and designed to be mounted on a shaft 8 and serves with a similar pulley or a plurality of similar pulleys (not shown) as a medium or instrumentality for supporting an endless conveyor belt (also not shown). As its principal parts or components the pulley comprises a pair of circular end walls 9, a pair of split tapered sleeves 10 for mounting the end walls 9 on the shaft 8, an elongated substantially cylindrical side wall 11, and a pair of split wedge-type rings 12 for mounting the ends of the side wall on the outer peripheral portions of the end walls.

The end walls 9 of the pulley are preferably in the form of one-piece iron castings and consist of hubs 13 and disc-like body parts 14. They extend around the shaft 8 and are spaced apart a distance corresponding to substantially the desired length of the pulley. The hubs 13 of the end walls 9 are so positioned and of such length that they extend both outwards and inwards of the body parts 14. They have outwardly flared inner peripheries and are of such size that the minimum internal diameter thereof is slightly greater than the diameter of the shaft 8. The body parts 14 of the end walls 9 are formed integrally with, and project outwards from, the central portions of the hubs 13 and preferably embody in the portions thereof that are midway between their outer and inner portions an annular series of openings 15 whereby access may be had to the pulley interior. The outer peripheral portions of the body parts 14 of the end walls are provided with integral outwardly extending annular flanges 16 and integral inwardly extending annular flanges 17. The outwardly extending annular flanges 16 surround, and are spaced an appreciable distance away from, the outer ends of the hubs 13 and embody outwardly tapered outer peripheries or surfaces 18. The inwardly extending annular flanges 17 surround, and are spaced outwards an appreciable distance from the inner ends of the hub parts 13 of the pulley end walls 9 and preferably have cylindrical outer and inner peripheries.

The split tapered sleeves 10 fit for the most part within the hubs 13 of the pulley end walls 9 and serve as mounting means for the end walls. They are provided on the outer ends thereof with integral outwardly extending flanges 19 and have inwardly tapered outer peripheries which are in conformity with or the complement of the outwardly flared inner peripheries of the hubs 13. The inner peripheries of the sleeves 10 are cylindrical and when the sleeves are not in use are of slightly greater diameter than the diameter of the shaft 8. Each sleeve 10 is provided with an annular series of screws 20 for forcing or shifting it in the direction of its associated hub 13. The screws 20 extend through holes 21 in the outwardly extending flanges 19 and into screw threaded holes 22 in the outer ends of the hubs 13. When the screws 20 are tightened they cause the sleeves to slide towards the hubs of the pulley end walls. In connection with inward sliding of the sleeves in response to tightening of the screws, the inwardly tapered outer peripheries of the sleeves coact with the outwardly flared inner peripheries of the hubs 13 in such manner as to cause the sleeves to contract into firm gripping relation with the adjacent portions of the shaft 8. When the sleeves are in their operative position, the end walls 9 of the pulleys are in fixed relation with the shaft and extend at outer right angles with respect to the shaft. When it is desired to dismantle the pulley the split inwardly tapered sleeves are slid away from the hubs 13 so as to release the pulley end walls 9 from the shaft 8.

The side wall 11 of the pulley extends around and between the end walls 9 and is adapted to support the aforementioned conveyor belt. It is formed of a section from a length of standard pipe 23 and has a substantially cylindrical inner periphery of slightly greater diameter than the external diameter of the pulley end walls 9. It is contemplated that the pipe 23 will be of cast iron, steel, aluminum or other suitable material. It is also contemplated that after the pulley is formed or assembled, the outer periphery will be machined so that it is of the desired configuration in the direction of its axis and also truly circular in cross section from end to end. If desired, the outer periphery of the pulley side wall may be machined (see dotted line in Figure 7) so that it tapers towards its ends and hence has a central crown for preventing lateral displacement of the conveyor belt that is supported by the pulley. As shown in the drawings, the length of the side wall 11 is slightly greater than the distance between the end walls 9 in order that the ends of the side wall project slightly beyond the outer surfaces of the outwardly extending annular flanges 16 on the outer peripheral portions of the body parts 14.

The split wedge-type rings 12 of the pulley are interposed between the outwardly tapered surfaces 18 of the outwardly extending annular flanges 16 and the end portions of the inner periphery of the side wall 11 and are adapted when shifted inwards in the direction of the pulley end walls 9 to expand and thereby not only cause the side wall 11 to assume a truly circular form but also effect connection of the ends of the side wall 11 to the outer peripheral portions of the pulley end walls. The outer peripheries of the rings 12 are cylindrical and the inner peripheries of the rings are inwardly flared so that they correspond to or are the complement of the outwardly tapered surfaces 18 of the outwardly extending annular flanges 16. The rings 12 are split diagonally instead of axially and hence when the rings are in place the ends of the side wall are supported throughout 360°. Each of the rings 12 is shifted or forced inwards into its operative position by way of an annular series of C-shaped clamps 24. Such clamps have associated with them bolts 25 and consist of radially extending crosspieces 26, outer inwardly extending side pieces 27 and inner inwardly extending side pieces 28. The outer surfaces of the rings 12 have annular grooves 29 for receiving the free ends of the outer side pieces 27 of the clamps 24 and the outer surfaces of the outwardly extending annular flanges 16 on the outer peripheral portions of the body parts 14 of the pulley end walls 9 are provided with annular grooves 30 for receiving the free ends of the inner side pieces 28 of the clamps 24. The bolts 25 extend through holes 31 in the central portion of the crosspieces 26 of the clamps 24 and into screw threaded holes 32 in the outwardly extending annular flanges 16. When the bolts 25 are tightened, the C-shaped clamps 24 fulcrum about the free ends of the inner side pieces 28 and rock in the direction of the outer side pieces 27. In connection with rocking of the clamps in response to tightening of the bolts 25 the split wedge-type rings 12 are forced inwards into their operative position wherein they serve, as hereinbefore pointed out, to connect the ends of the side walls 11 to the outer peripheral portions of the pulley end walls 9. It is contemplated that the rings 12 will be loosely positioned around the outwardly extending annular flanges 16 before the pulley side wall 11 is manipulated into place in connection with assembly of the pulley. It is also contemplated that when it is desired to dismantle the pulley, the bolts 25 will be loosened in order that the rings 12 may be shifted outward for side wall releasing purposes.

Figure 5:
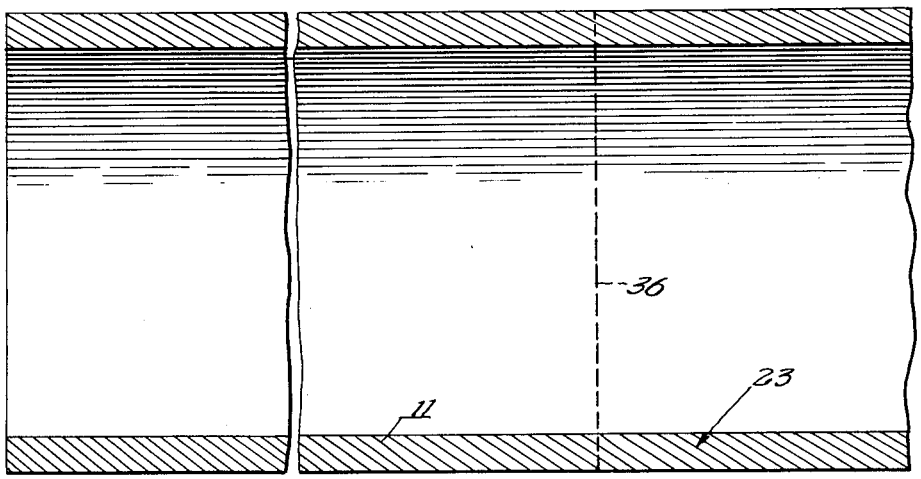
Figure 5 is a fragmentary longitudinal section of a length of standard pipe which is adapted to have a section cut from it in order to form the pulley side wall.

In order positively to lock the side wall 11 against angular displacement with respect to the end walls 9, each of the end walls is provided with an annular series of outwardly and radially extending bolts 33. Such bolts have heads at their inner ends and extend through radially extending holes 34 in the inwardly extending annular flanges 17 and into screw threaded holes 35 in the end portions of the side wall 11. Preferably, the holes 35 do not extend through the outer periphery of the pulley side wall. The bolts 33 are insertable into place by utilizing the openings 15 in the body parts of the pulley end walls 9. When it is desired to dismantle the pulley, the bolts 33 are loosened sufficiently to withdraw their outer ends from the screw threaded holes 35. In connection with formation or fabrication of the pulley the end walls 9 are mounted on the shaft 8 and are then moved towards or away from one another until the are positioned the desired or proper distance apart. Thereafter, the split tapered sleeves 10 are mounted on the ends of the shaft and are then slid inwards until they are disposed for the most part within the hubs 13 of the pulley end walls. After this operation, the bolts 20 are inserted through the holes 21 in the outwardly extending flanges 19 and into the screw threaded holes 29 in the outer ends of the hubs 13. Thereafter, the bolts 20 are tightened so as to contract the sleeves 10 around the adjacent portions of the shaft 8 and effect rigid mounting of the pulley end walls with respect to the shaft as shown in Figure 6 of the drawings. After mounting of the pulley end walls on the shaft 8 by way of the sleeves 10, the split wedge-type rings 12 are placed loosely around the outwardly tapered surfaces 18 of the outwardly extending annular flanges 16. Thereafter, the C-shaped clamps 24 are mounted loosely in place by inserting the bolts 25 through the holes 31 in the crosspieces 26 of the C-shaped clamps 24 and into the screw threaded holes 32 in the outwardly extending annular flanges 16. After the C-shaped clamps 24 are loosely mounted in place the pulley side wall 11 is formed by taking the length of standard pipe 23 and cutting it transversely (see dotted line 36 in Figure 5) in order to form a section of the proper length. It is to be understood that the pipe 23 will be of the proper diameter and desired thickness. After formation of the side wall 11 by cutting the length of pipe 23 the side wall is manipulated so that it extends concentrically around the shaft 8 and the ends thereof surround and are spaced outwards of the outer peripheral portions of the pulley end walls 9. Thereafter, the bolts 25 are tightened so as to cause the C-shaped clamps 24 to force inwards the split wedge-type rings 12. As previously pointed out, inward movement of the rings causes the rings to expand. In connection with expansion of the rings the side wall is caused to assume a truly circular form and to be fixedly connected through the medium of the rings to the outer peripheral portions of the end walls 9. After the side wall is mounted in place the bolts 33 are manipulated in position so as positively to lock the side wall against angular displacement with respect to the pulley end walls. At the conclusion of the aforementioned operations, the outer periphery of the side wall 11 is, if desired, machined so that it is of the desired configuration in the direction of its axis and also truly circular in cross section from end to end.

The herein described pulley effectively and efficiently fulfills its intended purpose and due to its particular construction and design may be produced at a comparatively low cost. Because of the particular arrangement of parts the pulley may be assembled and dismantled with facility. By utilizing a section of standard pipe as the side wall of the pulley, the pulley may be made to any specified or desired length. With the present pulley construction, it is only necessary for the manufacturer to purchase on the open market lengths of standard pipe and to keep on hand only pulley end walls of different diameters.

The invention is not to be understood as restricted to the details set forth or the particular sequence of steps since they may be modified within the scope of the appended claims without departing from the spirit and scope of the invention.

Having thus described the invention what I claim as new and desire to secure by Letters Patent is:

1. A pulley adapted to support a conveyor belt and comprising a pair of circular end walls positioned in coaxial relation and a predetermined distance apart, provided on the central portions thereof with shaft receiving hubs, and having annular outwardly tapered surfaces on their outer peripheral portions, and an elongated substantially cylindrical side wall extending around and between the end walls and having the ends thereof spaced radially outwards a small distance from said outer peripheral portions of the end walls, and a pair of split wedge-type rings interposed between the outer peripheral portions of the end walls and the ends of the side wall, having the outer peripheries thereof cylindrical and in gripping relation with the end portions of the inner periphery of the side wall and their inner peripheries flared inwards and in gripping relation with said annular outwardly tapered surfaces, and serving releasably to secure said side wall in connected relation with the end walls.

2. A pulley according to claim 1 and in which the side wall is formed of a section of standard pipe.

3. A pulley according to claim 1 and in which the side wall is formed of a section of standard pipe and has its outer periphery machined so that it is of the desired configuration in the direction of its axis and also truly circular in cross section from end to end.

4. A pulley according to claim 1 and in which the wedge-type rings are each of one piece construction and the splits of the rings extend diagonally in order that the ends of the side wall are supported throughout 360°.

5. A pulley adapted to support a conveyor belt and comprising a pair of circular end walls positioned in coaxial relation and a predetermined distance apart, provided on the central portions thereof with shaft-receiving hubs, and having annular outwardly tapered surfaces on their outer peripheral portions, and an elongated substantially cylindrical side wall extending around and between the end walls and having the ends thereof spaced radially outwards a small distance from said outer peripheral portions of the end walls, a pair of split one piece wedge-type rings interposed between the outer peripheral portions of the end walls and the ends of the side wall, having the outer peripheries thereof cylindrical and in gripping relation with the end portions of the inner periphery of the side wall and their inner peripheries flared inwards and in gripping relation with said annular outwardly tapered surfaces, and serving releasably to secure said side wall in connected relation with the end walls, and clamp means connected releasably to said outer peripheral portions of the end walls and operative to force the split wedge-type rings inwards.

6. A pulley adapted to support a conveyor belt and comprising a pair of circular end walls positioned in coaxial relation and a predetermined distance apart, provided on the central portions thereof with shaft receiving hubs, and having annular outwardly tapered surfaces on their outer peripheral portions, and an elongated substantially cylindrical side wall extending around and between the end walls and having the ends thereof spaced radially outwards a small distance from said outer peripheral portions of the end walls, a pair of split wedge-type rings interposed between the outer peripheral portions of the end walls and the ends of the side wall, having the outer peripheries thereof cylindrical and in gripping relation with the end portions of the inner periphery of the side wall and their inner peripheries flared inwards and in gripping relation with said annular outwardly tapered surfaces, and serving releasably to secure said side wall in connected relation with the end walls, and releasable means extending normally through said outer peripheral portions of the end walls and into the ends of the side wall and operative positively to lock the side wall against angular displacement with respect to the end walls.

7. A pulley according to claim 6 and in which the means for positively locking the side wall against angular displacement with respect to the end walls are in the form of bolts.

8. A pulley adapted to support a conveyor belt and comprising a pair of circular end walls positioned in coaxial relation and a predetermined distance apart, provided on the central portions thereof with shaft-receiving hubs, and having annular outwardly tapered surfaces on their outer peripheral portions, and an elongated substantially cylindrical side wall extending around and between the end walls and having the ends thereof spaced radially outwards a small distance from said outer peripheral portions of the end walls, a pair of split one piece wedge-type rings interposed between the outer peripheral portions of the end walls and the ends of the side wall, having the outer peripheries thereof cylindrical and in gripping relation with the end portions of the inner periphery of the side wall and their inner peripheries flared inwards and in gripping relation with said annular outwardly tapered surfaces, clamps connected removably to the outer peripheral portions of the end walls and operative to urge the split wedge-type rings inwards, and bolts extending outwards through said outer peripheral portions of the end walls and into the ends of the side wall and adapted positively to lock the side wall against angular displacement with respect to said end walls.

9. A pulley according to claim 8 and in which the side wall is formed of a section of standard pipe and has its outer periphery machined so that it is of the desired configuration in the direction of its axis and also truly circular in cross section from end to end.

10. That improvement in the manufacture of a belt-supporting pulley which comprises taking a pair of circular hub-equipped end walls of the desired external diameter and with outwardly tapered surfaces on their outer peripheral portions and mounting them on a shaft so that they are spaced apart a distance no greater than the desired length of the pulley to be formed and also so that they are in rigid relation and truly at right angles to the shaft, cutting from a length of standard pipe of slightly greater internal diameter than the external diameter of the end walls a section the length of which corresponds to the desired length of the pulley to be formed, manipulating the cut pipe section so that it extends concentrically around the shaft and the ends thereof surround and are spaced radially outwards of the outer peripheral portions of the end walls, and inserting between said outwardly tapered surfaces and the ends of the inner periphery of the pipe section split wedge-type rings with cylindrical outer peripheries and inwardly flared inner peripheries, and at the same time forcing the rings inwards so as to cause them to expand and thereby not only cause the pipe section to assume a truly circular form but also effect connection of the ends of the pipe section to said outer peripheral portions of the end walls.

11. That improvement in the manufacture of a belt-supporting pulley which comprises taking a pair of circular hub-equipped end walls of the desired external diameter and with outwardly tapered surfaces on their outer peripheral portions and mounting them on a shaft so that they are spaced apart a distance no greater than the desired length of the pulley to be formed and also so that they are in rigid relation and truly at right angles to the shaft, cutting from a length of standard pipe of slightly greater internal diameter than the external diameter of the end walls a section the length of which corresponds to the desired length of the pulley to be formed, manipulating the cut pipe section so that it extends concentrically around the shaft and the ends thereof surround and are spaced outwards of the outer peripheral portions of the end walls, inserting between said outwardly tapered surfaces and the ends of the inner periphery of the pipe section split one piece wedge-type rings with cylindrical outer peripheries and inwardly flared inner peripheries, and at the same time forcing the rings inwards so as to cause them to expand and thereby not only cause the pipe section to assume a truly circular form but also effect connection of the ends of the pipe section to said outer peripheral portions of the end walls, and machining the outer periphery of the cut pipe section so that it is of the desired configuration in the direction of its axis and also truly circular in cross section from end to end.

References Cited in the file of this patent

UNITED STATES PATENTS

| | | |
|---|---|---|
| 1,789,325 | Strong | Jan. 20, 1931 |
| 1,977,653 | Tanner | Oct. 23, 1934 |
| 2,429,293 | Peck | Oct. 21, 1947 |